United States Patent [19]
Witt et al.

[11] Patent Number: 5,655,616
[45] Date of Patent: Aug. 12, 1997

[54] HOVERCRAFT AND PROCESS OF REGULATING AIR CUSHION

[76] Inventors: Hans Witt; Henrik Witt, both of Ziegeleiweg 38, 25 421 Pinneberg; Karsten Witt, Rissener Landstrasse 253, 22 559 Hamburg, all of Germany

[21] Appl. No.: 495,628
[22] PCT Filed: Feb. 7, 1994
[86] PCT No.: PCT/EP94/00336
§ 371 Date: Jul. 19, 1995
§ 102(e) Date: Jul. 19, 1995
[87] PCT Pub. No.: WO94/18045
PCT Pub. Date: Aug. 18, 1994

[30] Foreign Application Priority Data

Feb. 8, 1993 [DE] Germany ............ 43 03 978.2
Aug. 27, 1993 [DE] Germany ............ 43 29 346.8

[51] Int. Cl.$^6$ ............................................. B60V 1/11
[52] U.S. Cl. ............................................. 180/117; 180/118
[58] Field of Search ................................. 180/116, 117, 180/118, 120

[56] References Cited

U.S. PATENT DOCUMENTS 3,889,775 6/1975 Luscher ............................ 180/118
4,103,755 8/1978 Tattersall .......................... 180/117

FOREIGN PATENT DOCUMENTS 3638785 5/1988 Germany ........................... 180/117
2095755 2/1982 United Kingdom ............... 180/117

OTHER PUBLICATIONS

Allison et al., Navy Technical Disclosure Bulletin, vol. 5, No. 5, pp. 51–54 May 1980.

*Primary Examiner*—Kevin Hurley
*Attorney, Agent, or Firm*—Michael J. Striker

[57] ABSTRACT

The surface effect vehicle comprises a plurality of lift fans for generating an air cushion, each of the fans having a drive with a motor and a regulating circuit with sensors and actuators for acting on the air cushion, each of the drives having an associated regulating circuit, the drive of the first one of the lift fans being operated as a master drive, while a rest of the lift fans being operated as follower drives. The process for regulating an air cushion in a surface effect vehicle with a plurality of lift fans whose drives have regulators and motors operated at a determined speed for generating an air cushion of a determined pressure or height and deliver corresponding output, a behavior of the lift fans conforming to a determined characteristic curve, the process comprises the steps of regulating every lift fan in such a way that one regulator serves as a master regulator which is followed by the rest of the regulators, so that the master regulator regulates a pressure or a height of the air cushion while the follower regulators regulate an output or a speed, where the output and volume flow or the speed of the master fan is used as a guidance variable.

20 Claims, 4 Drawing Sheets

HOVERCRAFT AND PROCESS OF REGULATING AIR CUSHION

BACKGROUND OF THE INVENTION

The present invention relates to a surface effect vehicle, in particular a waterborne vehicle, with a plurality of lift fans for generating an air cushion, each fan having a drive with a motor and a regulating circuit with corresponding sensors and actuators for acting on the air cushion. Further, the invention is directed to a process for regulating an air cushion in a surface effect vehicle with a plurality of lift fans whose drives have regulators and motors which are operated at a determined speed for generating an air cushion of a determined pressure or height and deliver a corresponding output, the behavior of the lift fans conforming to a determined characteristic curve.

A surface effect vehicle of this type is known, for example, from DT 36 38 785. The waterborne vehicle described therein has a plurality of lift fans for generating an air cushion, each fan having a drive with a motor and a regulating circuit which is linked with a computer and has sensors for influencing the air cushion.

The control can respond in various ways by suitable programming depending on the aim of optimization. However, this reference does not explain the precise way in which the drives are to be regulated as a function of the selected optimizing criterion.

The vertical fluctuations resulting from fluctuations in pressure cannot be eliminated by the known regulating devices of lift fans, especially when a plurality of lift fans are operated in parallel. This is because oscillations which can destroy the lift fans and other components occur constantly during parallel operation of the lift fans.

SUMMARY OF THE INVENTION

Accordingly, it is an object of the present invention to provide a hovercraft which avoids the disadvantages of the prior art.

More particularly, it is an object of the present invention to provide a surface effect vehicle and a process for operating lift fans which enables economical operation and an improved performance of the vehicle.

This object is met according to the invention by a surface effect vehicle in which each drive has an associated regulating circuit and the drive of a first lift fan is operated as a guiding drive or master drive while the rest of the lift fans are operated as follower drives.

The oscillations of the drives observed when lift fans are operated in parallel are prevented in this way. Every additional lift fan has its own drive with associated regulating circuits and the drive of the first lift fan is operated as a master drive, while the rest of the lift fans are operated as follower drives. The regulators are operated in such a way that one or more of the other fans is so regulated, depending on the output of the master drive, that the ventilator speed is adjusted in proportion to the square of the difference of the total volume flow of all parallel lift fans divided by the number of lift fans in parallel operation minus the volume flow of the regulated fan. More simply, the volume flow is measured and regulated. This essentially corresponds to a regulation of output, since the product of volume flow and air cushion pressure corresponds to output.

The measured output signal or speed signal or volume flow signal of the first lift fan is applied to the follower drives as a guide signal. The master regulating circuit is preferably a pressure regulating circuit or position regulating circuit and the follower regulating circuits are preferably speed regulating circuits or output regulating circuits or volume flow regulating circuits. The signal for the volume flow is preferably transmitted over a certain period of time which corresponds to a filtering. In so doing, the measured signal is not filtered directly, but rather the results of the regulating signal obtained after squaring are filtered.

Very brief disturbances, e.g., in the form of an individual wave, can be eliminated by regulation and ride quality can be increased when an additional pressure regulating circuit having a time component smaller than a time constant of a follower regulating circuit is associated with the master or follower regulating circuit.

Especially in view of the fact that the lift fan comprises aerodynamic elements, in particular blades with servoactuators, the ventilator characteristic curve can be changed temporarily in such a way that the ventilators temporarily displace more volume or less volume without an appreciable change in speed caused by a change in the characteristic curve.

Also, the characteristic curve of the ventilator is changed in that the lift fan has a reversible-flow duct which is closed during normal operation and constructed so as to connect the pressure side with the induction side and is opened, especially automatically, preferably by adjusting a flap, which allows a fast response to external disturbances in an economical construction.

The reversible-flow flaps can be pushed into their closed position, e.g., by a pretensioned spring. When a given cushion pressure is exceeded, the pretensioning is overcome and the flap opens. It closes again when the pressure drops. The actuating forces can be influenced in an advantageous manner by a systematic support of the flap.

To be particularly effective, the reversible-flow duct has a dosing mechanism whose drive is connected as an actuator in the continuing pressure regulating circuit. It is particularly advantageous to use the square of the defined regulating variable to control aerodynamic elements such as the guide blades or reversible-flow ducts.

Another construction of the invention provides an operating point detection device with an evaluating device for signalling an unstable operating point, preferably with automatic resetting to a stable operating point, and/or a cut-off device. This prevents unstable operating points, which are also uneconomical. In fact, it has been observed that air flows backwards through individual lift fans in part over long time periods and these additional losses must be compensated by the rest of the ventilators with a correspondingly high volume flow. In such cases, a ventilator operating unstably can be switched off automatically by suitable automatic detection of the operating point which can be realized, e.g., by calculating the quotient of the volume flow and speed. This considerably improves operation. In order to switch off, the ventilator must be outfitted with non-return valves for instance. A further possibility consists in using the results of the monitoring of the operating point to generate an alarm signal to alert the operator of the vehicle so that appropriate steps can be taken. Finally, it is possible to reset the operating point of the ventilator in question to a stable range by a forced increase in speed. The power losses resulting from reverse flow which are brought about by the escape of previously compressed air from the air cushion are accordingly prevented. Another disadvantage of such uncontrolled pressure fluctuations in the air cushion is that they lead to unpleasant motion in the ship which limits the useful possibilities of the vehicle. The lift fans are regulated according to the invention in such a way that they operate in the stable range of the characteristic curve with only brief exceptions. When one or more lift fans move into the vicinity of the peak of the characteristic curve, this means that the pressure is too high. This causes a surface effect vehicle to be lifted to unnecessarily high. In conventional vehicles, this results in a periodic blow-off of the excess air which is followed by a rapid fall of the vehicle and has a negative impact on the ride quality of the vehicle.

Particularly advantageous operating behavior results when the regulator in the pressure regulating circuit is constructed so as to act upon the output or speed of the lift fan based on a rule which provides for a change in speed ($\Delta n$) which is proportional in terms of quantity to the square root of the reference-to-actual deviation of the measured differential pressure between the cushion ($\Delta p_{actual}$) and atmospheric pressure and the reference differential pressure ($\Delta p_{reference}$). In so doing, the regulator preferably adjusts the speed or output proportionally to the root of the differential pressure between a reference differential pressure which is set from the bridge and the actual differential pressure measured in the cushion according to the following formula:

$$\frac{\Delta n}{n_{actual}} \approx +\sqrt{\frac{|\Delta P_{reference} - \Delta P_{actual}|}{\Delta P_{reference}}},$$

where $\Delta P_{reference} > \Delta P_{actual}$ $$\frac{\Delta n}{n_{actual}} \approx -\sqrt{\frac{|\Delta P_{reference} - \Delta P_{actual}|}{\Delta P_{reference}}},$$

where $\Delta P_{reference} > \Delta P_{actual}$

Further advantageous constructions of the vehicle are described in claims 8 to 10.

The object of the invention is also met in a process of the generic type in that every lift fan is regulated in such a way that one regulator serves as a master regulator which is followed by the rest of the regulators, so that the guiding master regulator preferably regulates the pressure or the height of the air cushion and the follower regulators regulate the output or speed, where the output and volume flow or the speed of the master fan is used as a guidance variable.

Because the guiding master regulator regulates pressure or height and the follower regulators regulate the output or speed, where the output or volume flow or speed of the master fan is used as a guidance variable, the speed of the satellite fans is stepped up or stepped down in such a way that all fans have identical volume flow or at least identical output. All fans then operate at approximately the same operating point. The regulating system according to the invention in which only one lift fan is set at a reference speed, while the other lift fans are adjusted by a follower regulation to maintain the same volume flow, ensures that all lift fans contribute in equal measure to the production of the leakage volume flow in the air cushion. This leakage volume flow is predetermined on the basis of the loading state and possibly other parameters such as vehicle speed, sea state, etc. This simplifies adaptation to the required cushion pressure and prevents excessive reciprocal influence of the lift fans and relative oscillations. Therefore, there is no negative flow through any of the fans for an extended period. In this way, the lift fans are reliably maintained in the range of stationary operating behavior and a satisfactory economical operation is ensured.

When they are acted upon individually by bypass flaps for the purpose of generating reverse flow, the lift fans can also be influenced aerodynamically depending on the pressure of the lift fan, preferably by generating a reverse flow.

If one or more fans have non-return valves, unwanted reverse flows are prevented as soon as a fan is switched off automatically or manually.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
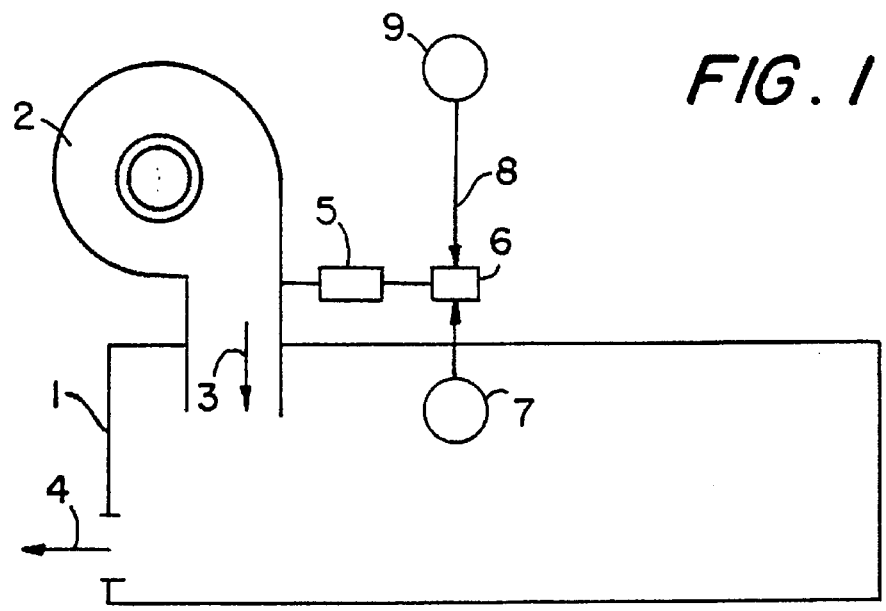
FIG. 1 shows the equivalent diagram of the air cushion of a surface effect vehicle with only one lift fan and its slow regulation of speed.

In FIG. 1, the system boundary of an air cushion 1 is represented schematically by the rectangle. In the air cushion 1, a determined volume flow 3 is transported in the direction of the arrow by the lift fan 2. A leakage volume flow 4, represented by an arrow, escapes from the air cushion 1 and counterbalances the feed volume flow 3 over the long term. Short-term differences between the feed volume flow 3 and leakage volume flow 4 lead to changes in the air cushion 1 with respect to its pressure difference $\Delta p$ and volume V state variables. Therefore, given constant surface area of the air cushion, changes in volume can be observed as changes in the height of the air cushion. Interference variables such as travel speed and wave height are manifested as changes in the leakage volume flow 4.

The cushion pressure difference $\Delta p$ is detected as a measurement quantity of the air cushion and the feed volume flow 3 is preferably detected as the measurement quantity for the lift fan 2. The product gives the aerodynamic output of the lift fan.

The master fan 2 is driven by the motor 5 which is acted upon by the regulator 6. The signal from a pressure sensor 7 and, via line 8, the signal from a reference value transmitter 9 installed in the bridge of the vehicle are applied to the regulator 6.

Figure 2:
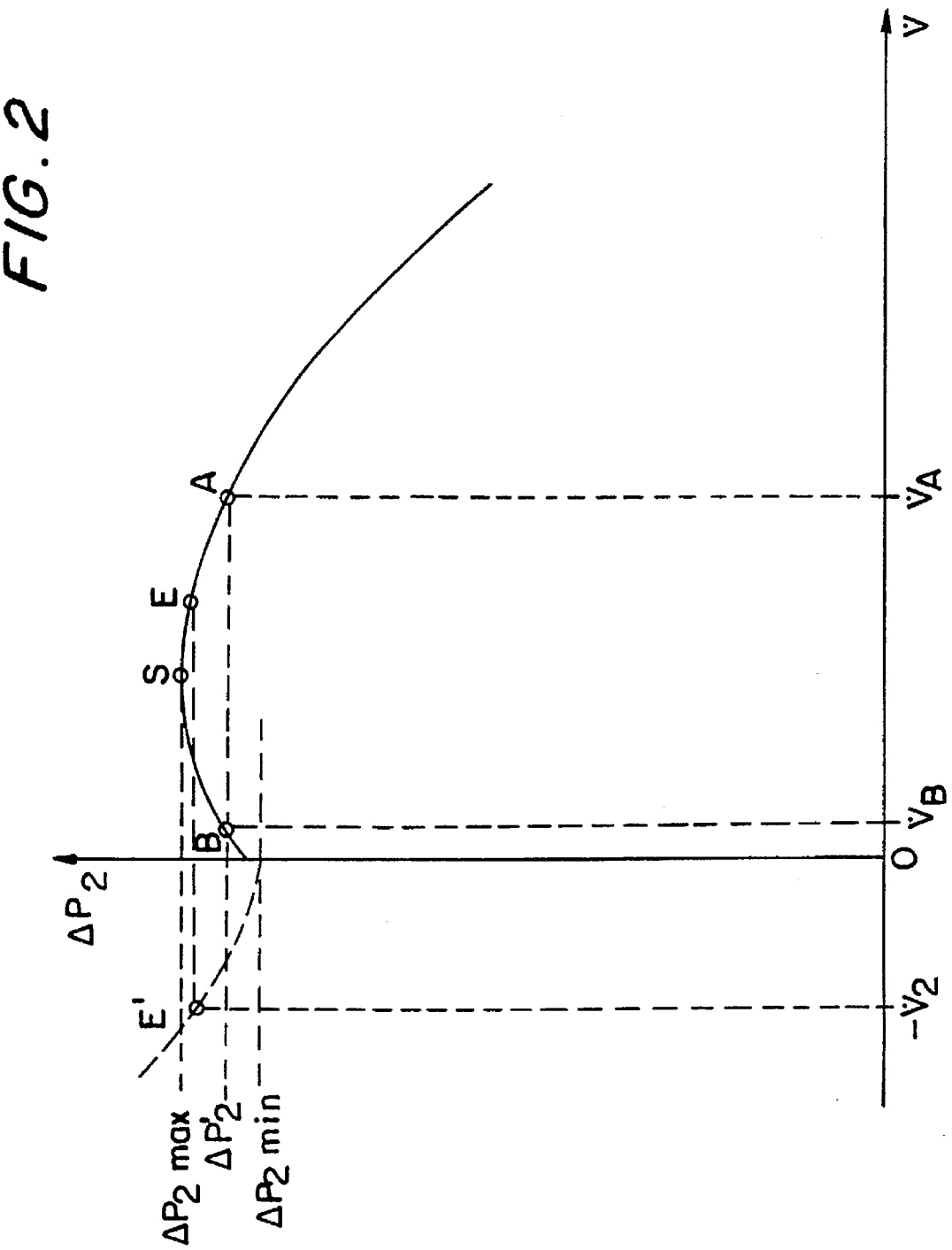
FIG. 2 shows the characteristic curve of a lift fan.

FIG. 2 shows a typical characteristic curve for the radial ventilator used as lift fan. The characteristic curve is valid for a determined speed. For every speed, there is an outlet pressure range $\Delta P_{2max}$ to $\Delta P_{2min}$ plotted as pressure on the ordinate. In this case, $\Delta$ signifies a differential pressure. At a specific volume flow V, the characteristic curve runs in the direction of the abscissa through a peak with pressure $\Delta P_{2max}$. Accordingly, for pressures between $\Delta P_{2min}$ and $\Delta P_{2max}$ there are, in each instance, two theoretical operating points A, B at the same pressure $\Delta P_{2}$, although with very different volume flows $V_A$ and $V_B$. Problem-free parallel operation of two ventilators would not be possible with this characteristic curve in the pressure range of $\Delta p_{2max}$ to $\Delta p_{2min}$ without taking special steps. For example, in the event that a lift fan operates at operating point B, the first lift fan moves farther to the left on the characteristic curve to the smaller volume flow and greater $\Delta P2$ in the new operating point when the cushion pressure increases due to external influences such as sea state. A second lift fan is pushed toward a lower volume flow by the increasing air cushion pressure until its pressure corresponds to the air cushion pressure at operating point E'. As will be seen from the drawing, the displaced volume can be negative, i.e., air flows backward through the ventilator at $-V2$, which is designated as overblowing.

This operating point B and, in general, every operating point to the left of the peak is undesirable, since it can result in constant oscillations which can destroy the lift fan and other components.

Figure 3:
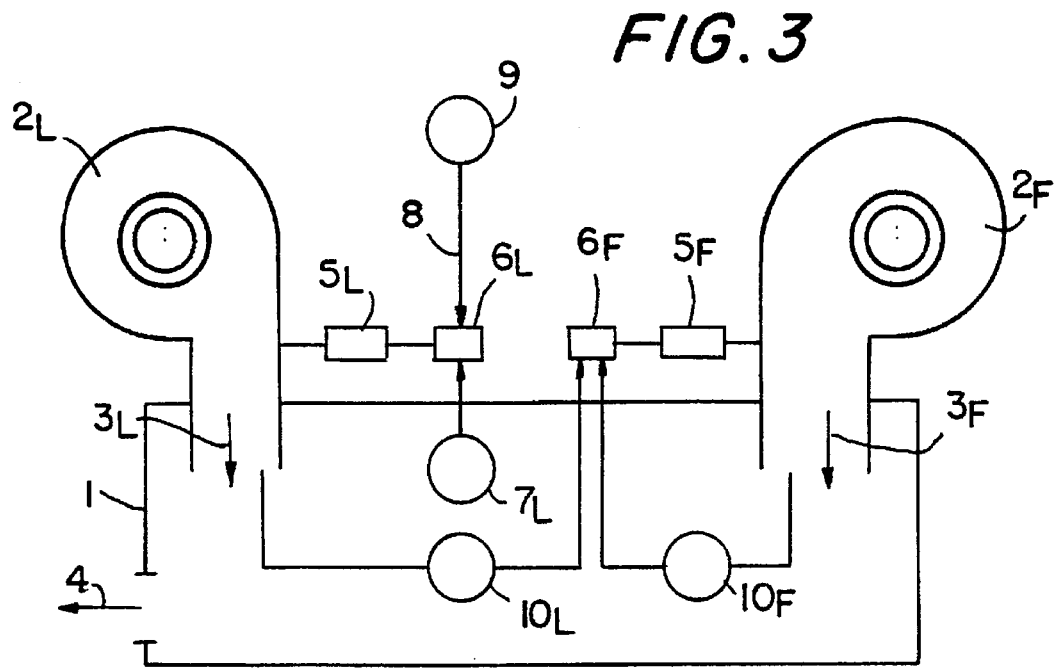
FIG. 3 shows the equivalent diagram of a surface effect vehicle with a master lift fan and a satellite lift fan.

FIG. 3 shows a surface effect vehicle according to the invention with two lift fans in parallel operation. To distinguish the parts of the two fans having identical functions, those parts associated with the master fan receive reference numbers with "L" and those associated with the follower fans receive reference numbers with "F". The follower fan also has a regulator 6 and a motor 5 acted upon by the latter. The measurement signal from a volume flow sensor 10 and the signal from a volume flow sensor 10 are applied to the regulator as input quantities.

According to the invention, one of the parallel lift fans is connected as a so-called master fan which is adjusted manually from the bridge by transmitters 9 to an air flow or speed corresponding to the desired pressure. The speed is stepped up to the required value by a speed governor 5. This regulation produces an increase in speed when the pressure drops relative to the predetermined value. Conversely, an increase in pressure leads to a reduction in speed. The regulation is so designed that the speed changes by the square of the pressure difference and is adjusted asymptotically. The cushion pressure is measured by the pressure sensor 7. The signal transmitted over an adjustable time period is utilized for comparison with the reference pressure. The other parallel cushion fan or fans has/have a speed regulation which uses the difference in the volume flows of the master fan and individual volume flow, or possibly also the output differential, as an input quantity. These input quantities are constantly detected by the volume flow transmitters $10_L$ and $10_F$ using measurement techniques. The speed of the follower satellite fans is then stepped up or stepped down so that all fans produce the same volume flow 3F or at least the same wave output. In this case, all of them are working at approximately the same operating point.

Thus, only one lift fan is regulated at a reference speed via the cushion pressure, while the other lift fans are adjusted to maintain the same volume flow by a follower regulation. This ensures that all lift fans contribute approximately equally in producing the leakage volume flow 4 in the air cushion 1. The leakage volume flow is predetermined as a function of the loading state and, as the case may be, on other parameters such as vehicle speed, sea state, etc.

Figure 4:
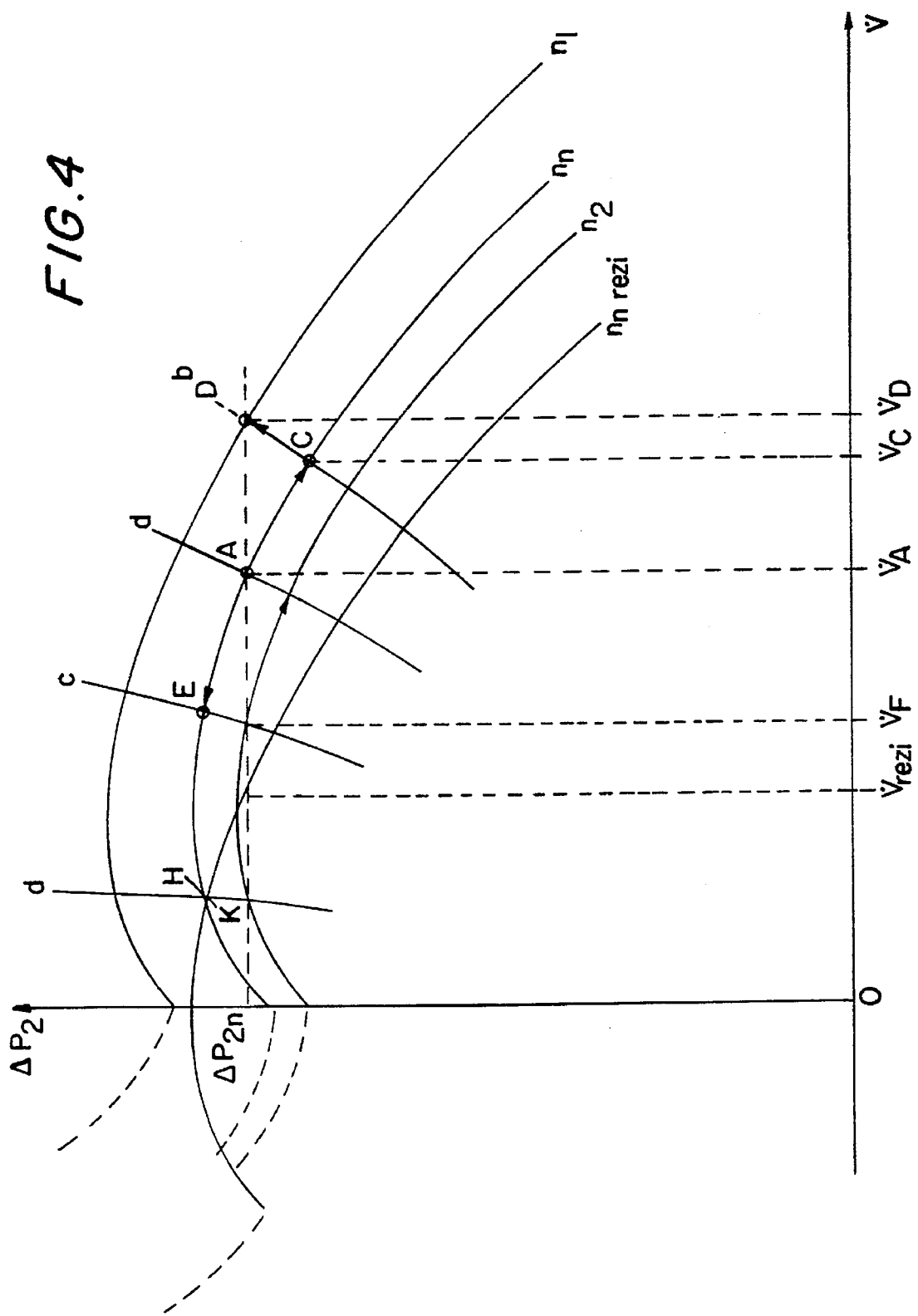
FIG. 4 shows a family of characteristic curves for a plurality of lift fans in parallel operation in the stationary range.

FIG. 4 shows a family of characteristic curves for a lift fan at different speeds to illustrate the slow regulating system. In the stationary state, for example, as will be seen from FIG. 4, the master fan works at operating point A which is the intersection of the characteristic curve at normal speed $n_n$ and the resistance characteristic curve a of the air cushion.

If the cushion pressure should drop, for instance, when traveling on sea because more air escapes from the air cushion due to increased leakage volume flow, the resistance characteristic curve b is adjusted. Consequently, the operating point of the master fan moves from A to C at constant speed and the volume flow increases from $V_A$ to $V_C$. At the same time, the cushion pressure drops and the immersion depth of the vehicle increases. The speed regulation which is now initiated increases the speed to $n_1$ so that the originally desired cushion pressure is restored at point D. The volume flow increases from $V_C$ to $V_D$. However, this increase need not be coped with exclusively by the master fan. The satellite ventilators follow along via the load distribution control and take over their share of the required volume flow increase.

On the other hand, in the event of a decrease in the mean leakage volume flow, e.g., corresponding to the throttle curve C, the cushion pressure would increase and the new operating pressure E would be adjusted. However, the overpressure, in proportion to the given reference pressure, decreases the speed of the master fan, followed by the satellite fans, to the new speed $n_2$ at operating point F. The regulating time constants are fallible, so that the mean cushion pressure remains as constant as possible. In this case, it may be advisable that the time constant of the master fan regulation is greater than that of the satellite regulators so that the latter lag only slightly behind the master fan.

Rapid variations in load, e.g., at the wave frequency, will hardly affect the speed due to the large rotating masses of the lift fan and driving motor. Since the speed regulation system is controlled by a mean pressure value over an adjustable time period, it also does not receive any control pulses. A typical regulating time constant is roughly 30 to 60 seconds.

If the operating point should move into the region to the left of the peak of the characteristic curve under the influence of rapid reductions in leakage flow, it is possible to carry out additional regulating steps. These steps are so designed that the volume flow displaced in the air cushion is reduced very quickly to prevent the peak from being exceeded.

To this end, a bypass regulation is provided according to the invention to return the lift fan or lift fans to the region to the fight of the peak of the characteristic curve. The bypass regulation has the advantage that no additional blow-off ducts need be provided, i.e., they are integrated directly in the lift fan. Accordingly, the bypass regulation effects a change in the characteristic curve of the lift fan. This regulation according to the invention takes effect more rapidly because of the short distances and smaller moved masses. At low volume flow, the operating point moves from A to E to F as the leakage resistance increases as shown in FIG. 4. When the resistance curve jumps back to a, the operating point creeps from F to G and slowly back toward A. In this case, the bypass regulation does not come into play. However, if the leakage resistance climbs to throttle curve d, the new unstable operating point H is adjusted. Before reaching the point when the slow speed regulation of the ventilator can respond, the bypass regulation takes effect. By recirculating a portion of the air, shown here for a volume flow $V_{rezi}$, the new line $n_{nrezi}$ occurs. The intersection with the throttle curve d gives the operating point K which hardly differs from H, but which is stable. When the resistance continues to increase, the ventilator is not overblown.

According to the invention, the bypass is controlled in such a way that it opens above a given limiting pressure. For this purpose, for example, the control can respond to the volume flow, dynamic pressure or cushion pressure.

Since the pressure compensation in the air cushion takes a finite period of time because of the necessary displacement of air masses, it is particularly advantageous to effect the pressure decrease directly at the lift fan in order to maintain the lift fan in the stable operating region and prevent negative flow of air.

According to the invention, if the bypass regulation responds frequently as detected preferably by a counting instrument, the bridge is alerted when this frequency exceeds a determined quantity. The ventilators displace substantially more air than is necessary. Accordingly, one or more fans can be switched off manually or automatically at determined intervals. In so doing, the flow-in opening of the fans is closed. Non-return valves are advantageously provided for closing, since they require no additional actuating drives.

It will be observed from inspection of conventional surface effect vehicles that the lift fans are usually designed for the heaviest seas with high leakage flow losses. For a large part of the time, however, they are operated in good weather with low leakage losses. They are then forcibly operated close to peak with frequent slipping into the overflow range. Riding comfort is reduced and energy consumption is higher than when a smaller number of ventilators are operated. The same effect is not achieved by stepping down the speed, since the change-over point is only displaced slightly.

In heavy seas and accordingly with sharply varying leakage flows, it may be advantageous to operate the ventilators at high speed and to keep the bypass flaps open partially at all times. When the leakage flow drops and pressure increases, more air flows back through the bypass so that the ship is stabilized.

It is a different matter if the pressure in the air cushion drops when the vehicle is exchanged, since more air can escape. The volume flow delivered in the air cushion must now be increased quickly, i.e., the bypass regulation must be closed again quickly.

Special requirements are imposed on the regulation of lift fans by unstable behavior of the lift fans which occurs when traveling over sea due to rapid changes in the air cushion. The characteristic curve then exhibits a frequency-dependent hysteresis.

Figure 6:
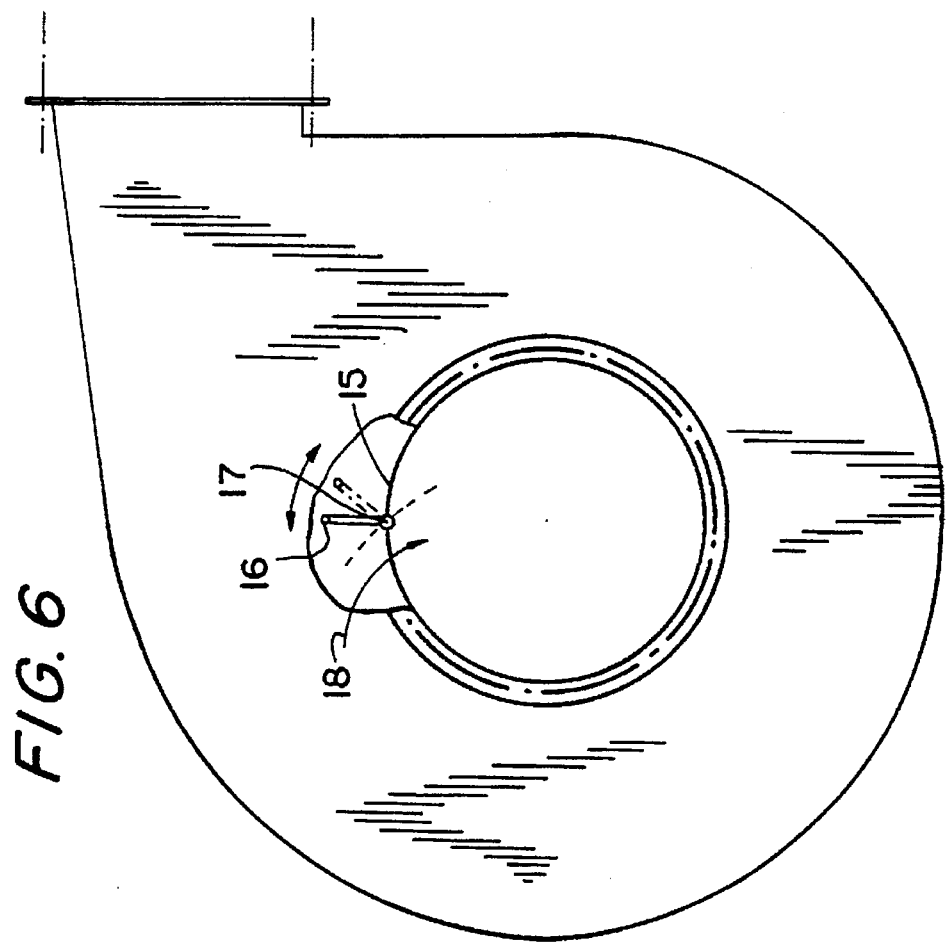
FIG. 6 shows a top view of the lift fan with partially exposed housing.
Figure 5:
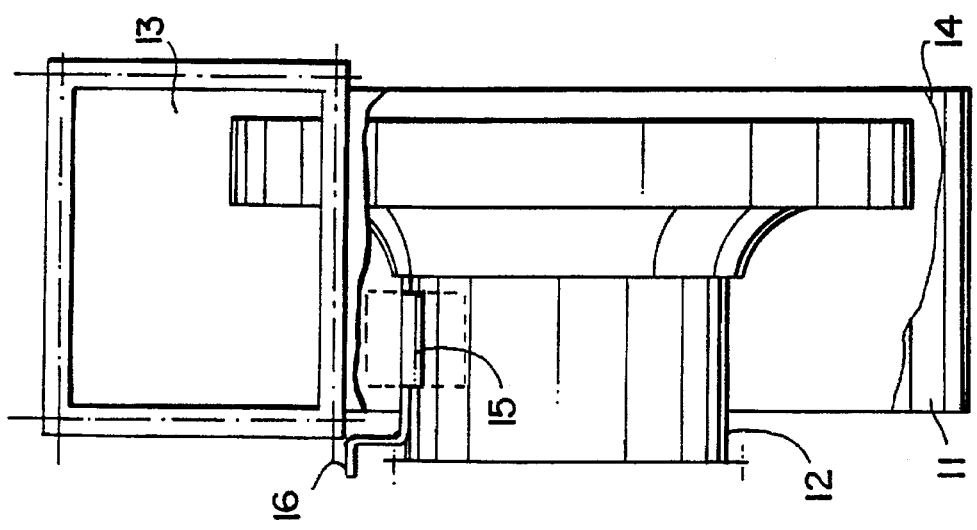
FIG. 5 shows a side view of a lift fan with partially exposed housing.

FIG. 5 shows a fan, according to the invention, with a bypass for recirculating a partial volume flow. It has a housing 11 with an axially aligned suction or intake pipe 12 and a tangentially arranged diffusor 13 through which the air is expelled. Part of the housing wall is not shown as indicated by the broken line 14, so that the portion of the intake pipe 12 projecting into the housing 11 is visible. A flap 15 is provided in this portion and can be opened by swiveling an actuating lever 16 about axis 17 (FIG. 6). The flap is shown in its open position by the dashed line. In this position, air can be guided out of the pressure region of the lift fan according to arrow 18 back into the suction region of the intake pipe 12.

The actuating lever 16 is connected with a suitable servodrive which is controlled in turn by a regulator as described above.

For certain applications it may be sufficient to keep the flap closed merely by pretensioning to a certain extent so that it opens automatically when exceeding a pressure which overcomes the pretensioning.

In this way, a surface effect vehicle having improved performance and economical operation is provided.

It will be understood that each of the elements described above, or two or more together, may also find a useful application in other types of constructions differing from the types described above.

While the invention has been illustrated and described as embodied in a hovercraft and process of regulating air cushion, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A surface effect vehicle, comprising a plurality of lift fans for generating an air cushion, each of said fans having a drive with a motor and a regulating circuit with sensors and actuators for acting on the air cushion, each of said drives having an associated regulating circuit, said drive of the first one of said lift fans being operated as a master drive, while a rest of said lift fans being operated as follower drives which receive a signal from said master drive.

2. A surface effect vehicle as defined in claim 1, wherein said guiding drive is a drive.

3. A surface effect vehicle as defined in claim 1 it and further comprising means for producing a signal applied to said follower drives as a guide signal, said regulating circuits include a master regulating circuit associated with said master drive and follower regulating circuits associated with said follower drives.

4. A surface effect vehicle as defined in claim 3, and further comprising means for producing a signal selected from the group consisting of a measured output signal, a speed signal and a volume flow signal.

5. A surface effect vehicle as defined in claim 3, wherein said master regulating circuit is formed as a circuit selected from the group consisting of a pressure regulating circuit and a position regulating circuit.

6. A surface effect vehicle as defined in claim 3, wherein each of said follower regulating circuits is a circuit selected from the group consisting a speed regulating circuit, an output regulating circuit and a volume flow regulating circuit.

7. A process for regulating an air cushion in a surface effect vehicle with a plurality of lift fans whose drives have regulators and motors operated at a predetermined speed for generating an air cushion of a predetermined parameter selected from the group consisting of a pressure and a height and deliver corresponding output, a behavior of the lift fans conforming to a predetermined characteristic curve, the process comprising the steps of regulating every lift fan in such a way that one regulator serves as a master regulator which is followed by the rest of the regulators, so that the master regulator regulates a parameter selected from the group consisting of a pressure and a height of the air cushion while the follower regulators receive a signal from the master regulator and regulate an output or a speed, where the output and volume flow or the speed of the master fan is used as a guidance variable.

8. The process as defined in claim 7, and further comprising the step of acting upon the lift fans aerodynamically during the regulating depending upon pressure.

9. The process as defined in claim 7, wherein said step of acting includes acting on the lift fans by generating a reverse flow.

10. The process as defined in claim 7; and further comprising the steps of monitoring an operating point of the lift fan during the regulating and generating an alarm signal automatically when an unstable operating point is detected.

11. The process as defined in claim 7; and further comprising the steps of monitoring an operating point of the lift fan during the regulating; and stopping the lift fan automatically when an unstable operating point is detected.

12. The process as defined in claim 7; and further comprising the steps of detecting a frequency of reverse flow events during the regulating; and effecting regulation with a hysteresis which is adjusted in accordance to the frequency of the reverse flow events determined.

13. A surface effect vehicle, comprising a plurality of lift fans for generating an air cushion, each of said fans having a drive with a motor and a regulating circuit with sensors and actuators for acting on the air cushion, each of said drives having an associated regulating circuit, said drive of the first one of said lift fans being operated as a master drive, while a rest of said lift fans being operated as follower drives; and further an additional pressure regulating circuit having a time constant of at least one of said master regulating circuit and said follower regulating circuit, said additional pressure regulating circuit being associated with at least one of said master regulating circuit and said follower regulating circuit.

14. A surface effect vehicle, comprising a plurality of lift fans for generating an air cushion, each of said fans having a drive with a motor and a regulating circuit with sensors and actuators for acting on the air cushion, each of said drives having an associated regulating circuit, said drive of the first one of said lift fans being operated as a master drive, while a rest of said lift fans being operated as follower drives, said lift fans having a duct which is closed during normal operation and formed so as to connect a pressure side with an induction side and is opened automatically; and further comprising a flap operative for automatically opening said reversible flow duct.

15. A surface effect vehicle as defined in claim 14, wherein said duct is provided with a closing mechanism including a drive.

16. A surface effect vehicle, comprising a plurality of lift fans for generating an air cushion, each of said fans having a drive with a motor and a regulating circuit with sensors and actuators for acting on the air cushion, each of said drives having an associated regulating circuit, said drive of the first one of said lift fans being operated as a master drive, while a rest of said lift fans being operated as follower drives; and an operating point detection device with an evaluating device for signaling an unstable operating point.

17. A surface effect vehicle as defined in claim 16; and further comprising means for automatically resetting to a stable operating point in response to the signalling an unstable operation point.

18. A surface effect vehicle as defined in claim 16; and further comprising a cut-off device operative in response to the signalling of an unstable operating point.

19. A surface effect vehicle, comprising a plurality of lift fans for generating an air cushion, each of said fans having a drive with a motor and a regulating circuit with sensors and actuators for acting on the air cushion, each of said drives having an associated regulating circuit, said drive of the first one of said lift fans being operated as a master drive, while a rest of said lift fans being operated as follower drives, said lift fan being arranged diffusor in a housing, said lift fans having a reversible-flow duct formed as a dividing flap between said intake pipe and said diffusor.

20. A surface effect vehicle, comprising a plurality of lift fans for generating an air cushion, each of said fans having a drive with a motor and a regulating circuit with sensors and actuators for acting on the air cushion, each of said drives having an associated regulating circuit, said drive of the first one of said lift fans being operated as a master, while a rest of said lift fans being operated as follower drives; means for producing a signal applied to said follower drives as a guide signal, said regulating circuits include a master regulating circuit associated with said master drive and follower regulating circuits associated with said follower drives; said master circuit being a pressure regulating circuit provided with a regulator, said regulator being formed so as to act upon one of an output and a speed of said lift fan based on a rule which provides for a change in speed which is proportional in terms of quantity to a square root of a reference-to-actual value deviation of a measured differential pressure between the air cushion and atmospheric pressure and a reference differential pressure.

* * * * *